United States Patent [19]

Haack et al.

[11] Patent Number: 4,613,445

[45] Date of Patent: Sep. 23, 1986

[54] ORGANOPHOSPHATE-CONTAINING ANTIFREEZE

[75] Inventors: John L. Haack, Elmsford; Paul H. Mohr, Chappaqua, both of N.Y.

[73] Assignee: Union Carbide Corporation, Danbury, Conn.

[21] Appl. No.: 633,210

[22] Filed: Jul. 23, 1984

[51] Int. Cl.$^4$ .................................................. C09K 5/00
[52] U.S. Cl. ..................................... 252/75; 252/78.5; 252/180; 252/389.2; 252/389.23; 422/15
[58] Field of Search ............. 252/75, 78.5, 180, 389.2, 252/389.23; 422/15

[56] References Cited

U.S. PATENT DOCUMENTS

| | | | |
|---|---|---|---|
| 2,384,553 | 9/1945 | Kiffer | 252/389.2 |
| 3,282,846 | 11/1966 | Scott | 252/75 |
| 3,510,436 | 5/1970 | Silverstein et al. | 422/15 |
| 4,210,549 | 7/1980 | Hirozawa et al. | 252/75 |
| 4,360,474 | 11/1982 | Brady et al. | 260/429.5 |
| 4,465,516 | 8/1984 | Danner et al. | 422/15 |

FOREIGN PATENT DOCUMENTS

EP2530 12/1977 European Pat. Off. .
2756747 6/1979 Fed. Rep. of Germany .

Primary Examiner—Paul Lieberman
Assistant Examiner—Robert A. Wax
Attorney, Agent, or Firm—Dominic J. Terminello

[57] ABSTRACT

Antifreeze composition and composition concentrate containing at least one organophosphate in buffer/alcohol, together with method of using the composition and composition concentrate.

10 Claims, No Drawings

ORGANOPHOSPHATE-CONTAINING ANTIFREEZE

CROSS REFERENCE TO RELATED APPLICATIONS

This application is related to the subject matter of concurrently filed U.S. application Ser. Nos. 633,209 and 633,444.

FIELD OF THE INVENTION

The present invention relates generally to heat transfer fluids and, more specifically, to an antifreeze containing an organophosphate as an anticorrosive agent.

BACKGROUND OF THE INVENTION

Conventional alcohol-based heat transfer fluids, such as automobile antifreezes, have the tendency to corrode the metal (e.g. most notably aluminum, but also copper, iron, brass and solder) surfaces of the heat transfer system. In automobile "coolant systems" (hereinafter also called "cooling systems"), any aluminum corrosion that occurs not only damages the metal surface being attacked by corrosion, but also adversely affects other parts of the coolant system due to a phenomenon called "transport deposition". By virtue of transport deposition, soluble aluminum corrosion products formed at hot engine surfaces are carried to and precipitated on the cooler radiator tubes, where they form heat-insulating films or coatings that impair heat-transfer.

In view of this corrosion problem, numerous corrosion inhibitors have been developed over the years for use in antifreezes, including inorganic phosphates, silicates, phosphonates, borates, azoles, siliconates, nitrates, nitrites, and the like. The need for even more effective corrosion inhibitors in antifreezes has been fostered by the changing metallurgy of vehicular cooling systems in favor of increasing use of aluminum and by smaller, harder working automotive engines having high operating engine temperatures.

Heretofore, organophosphates in antifreezes compositions were not known in the art to the best of our knowledge. However, certain organophosphate esters have been disclosed for use as lubricants and corrosion inhibitors. For example, ethylene oxide-containing organophosphates and propylene oxide-containing organophosphates and a method of preparing them are disclosed in U.S. Pat. No. 4,360,474. As an additional illustration, German patent application No. 2,756,747 discloses PO/EO and PO/BO containing phosphate esters (wherein "EO" denotes ethylene oxide, "PO" denotes propylene oxide and "BO" denotes butylene oxide) useful as lubricants and corrosion inhibitors. The compounds of this publication are made by reacting polyphosphoric acid with aliphatic diols, triols, or tetrols. The organophosphates of the German application have molecular weights between 200 and 8,000. This German application is primarily directed to low-foaming and corrosion inhibited metal working lubricating fluids and does not disclose antifreeze formulations.

OBJECT OF THE INVENTION

It is an object of the present invention to provide an antifreeze, and its corresponding concentrate, which is characterized by reduced corrosiveness toward metals, including aluminum, as compared to conventional antifreezes.

Thise and other objects will become apparent from a reading of the following detailed specification.

SUMMARY OF THE INVENTION

In one aspect, the present invention relates to an antifreeze composition concentrate comprising:

(a) alcohol, (b) at least one buffer selected from the group consisting of salts of boric, phosporic, benzoic, substituted benzoics, dibasic acids having from 6 to 20 carbon atoms, and mixtures thereof, and (c) at least one alkylene oxide-containing organophosphate in a corrosion inhibiting-effective amount, said organophosphate being selected from the group consisting of PO- and PO/EO-containing organophosphate mono-, di-, and tri-esters and mixtures thereof, wherein the PO content is at least 60% based on the weight of the total PO+EO in the ester and wherein the PO-containing organophosphate esters have a molecular weight between 650 and 1400 and wherein the PO/EO-containing organophosphate esters have a molecular weight between 1100 and 4500.

In another aspect, the invention relates to the antifreeze composition produced by diluting the above concentrate with water and/or alcohol.

In still another aspect, the present invention relates to a method of using the above antifreeze composition and composition concentrate.

DETAILED DESCRIPTION OF THE INVENTION

The preferred organophosphates useful in the present invention are those made by reacting phosphoric acids with aliphatic mono-ols, diols, triols or tetrols containing either all PO or PO/EO mixtures with a high PO content of at least 60 wt. % based on the weight of the PO+EO in the alcohol reactant. Such a reaction is well-known and is described by L. W. Burnette in *Nonionic Surfactants*, vol 1, p 372-394 (Marcel Dekker, Inc. 1966).

Additionally, the preferred organophosphates useful in the present invention can contain minor amounts of higher alkylene oxide moieties such as, for example, butylene oxide (BO), in an amount of up to 10 weight percent based upon the total weight of alkylene oxide present.

Generally the organophosphates useful in the present invention are a subclass of those compounds identified by the structural formula:

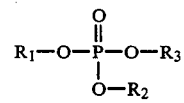

wherein each substituent $R_1$, $R_2$, and $R_3$ is selected from the class consisting of the following radicals: hydrogen, alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

The preferred organophosphates have the structural formula identified above wherein at least one R substituent consists of an organic radical containing an alkylene oxide polymer or copolymer derivative of from $R_4O(PO)_x(EO)_y(BO)_z—$, wherein the alkyleneoxide units may be either random or blocked and wherein $x>y>>z$ and $x+y+z\leq$ about 100, and $R_4$ is selected from the class of radicals: hydrogen; alkyl, aryl, alkenyl and alkynyl with the foregoing having up to about 24 carbon atoms; phosphates, polyphosphate and salts thereof, and combinations thereof.

The amount of organophosphate employed in the concentrates of the present invention can vary over a wide range, but is preferably used in an amount of between 0.001 and about 30 weight percent, more preferably between about 0.005 and about 1, most preferably between about 0.005 and about 0.1, based on the weight of the concentrate. Below the 0.001 weight percent, the amount of organophosphate is expected to be insufficient to be effective, whereas above about 30 percent organophosphate is expected to provide no significant further corrosion inhibition benefits.

More preferred organophosphates are identified by structural formulae I to III, and the free acids and salts thereof, together with mixtures thereof.

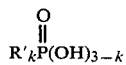  (I)

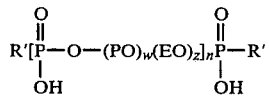  (II)

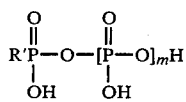  (III)

wherein
  $R'=[RO(PO)_x(EO)_y]$ wherein R=H or alkyl, aryl, alkylaryl, arylalkyl, alkenyl or alkynyl having up to 24 carbon atoms
  PO=Propylene oxide radical
  EO=Ethylene oxide radical
  $x=1$ to 100
  $y=0$ to 100
  $k=1$ to 3, with the proviso that when $k=3$, at least one R' group is removed from the phosphate ester by hydrolysis prior to or during use
  $n=1$ to 100
  $w=0$ to 100 with the proviso that when w is $\geq 1$, k can be zero
  $z=0$ to 100
  $m=1$ to 10

Within a given formula where x, y, w or z values appear more than once, the values may be the same or different numbers.

Typical useful classes of organophosphates falling within the groups identified by structural formulae I through III above, are identified as follows:

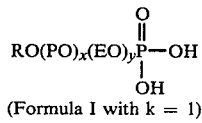

Example 1
(Formula I with k = 1)

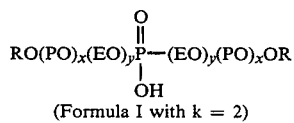

Example 2
(Formula I with k = 2)

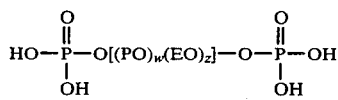

Example 3

(Formula II with n = 1
x = 0
y = 0
R = H)

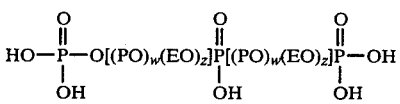

Example 4

(Formula II with n = 2
x = 0
y = 0
R = H)

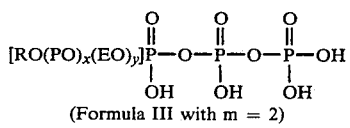

Example 5
(Formula III with m = 2)

A buffer or mixture of buffers is employed in the antifreeze concentrates and compositions of the present invention. The buffer can be employed in a wide range of amounts, but is preferably used in an amount of between about 0.1 and about 10 wt. percent (more preferably between about 0.1 and about 5 wt. percent) based on the weight of the concentrate. Below 0.1 wt. percent, the amount of buffer would be expected to be insufficient to be effective, whereas above 10 wt. percent the amount of buffer would be too costly. The preferred buffer is borate. The borate useful in the composition concentrate in the present invention is conveniently added as the sodium tetraborate pentahydrate salt. This salt is readily commercially available. After adding the salt, addition of sodium hydroxide can be used to provide the desired mixture of metaborates and tetraborates and sodium hydroxide in the concentrate. Among other functions, the buffer serves to provide the desired pH, preferably a concentrate pH between about 5.5 and about 11, and reserve alkalinity (RA) during use.

Other compounds useful as buffers in the composition concentrate of the present invention include: phosphates, such as alkali metal phosphates; benzoates and substituted benzoates, such as alkali metal hydroxybenzoate; and, salts of dibasic acids having 6 to 20 carbons, such as sodium sebacate.

The alcohol employed in the composition of this invention preferably is at least one alcohol selected from the group consisting of methanol, ethanol, propanol, ethylene glycol, diethylene glycol, triethylene glycol, propylene glycol, dipropylene glycol and glycerol. However, other alcohols can be used such as, for example, butylene glycol, the monoacetate of glycerol, the dimethylether of glycerol, and alkoxyalkanols (such as methoxyethanol).

Optional additives may be employed in minor amounts of less than 50 wt. percent based on the weight of the concentrate. Typical optional additives would include, for example, known corrosion inhibitors for metals such as, for example, molybdates, phosphates and benzoates, hydroxy benzoates or acids thereof, silicones, alkali metal nitrates, alkali metal nitrites, tolyltriazole (hereinafter "TTZ"), mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the metal surfaces to be protected. Other typical optional additives would include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the art that do not adversely affect the antifreeze characteristics sought to be achieved.

The following example is merely illustrative of, and not intended to limit the present invention.

EXAMPLE 1

A. Preparation of Organophosphate

A typical organophosphate was prepared using BASF Wyandotte's "Pluronic L81" polyol as a starting material. To a solution of 9.0 grams of "Pluronic L81" in 30.0 ml. of benzene placed in a 100 ml. 3-neck round bottom flask was added 1.0 grams of phosphorous pentoxide. The mixture was gently heated to between 45° and 50° with stirring for about three hours. The reaction mixture was allowed to cool to room temperature for about sixteen hours and then refluxed at 80° C. for about three to four hours. The reaction mixture was then cooled and filtered to remove the insoluble brown residues. The filtrate was then concentrated under reduced pressure to afford 9.0 grams (86% yield) of crude product, identified by elemental analysis to be $C_{141}H_{282}O_{49}P$.

The above procedure was followed in analogous fashion to provide the various crude phosphate esters identified in Table I below.

B. Preparation of Antifreeze

An antifreeze concentrate was prepared from each of the crude phosphate esters identified in Table I by mixing 0.1 wt. percent of each phosphate ester into a base fluid having the following composition:

| BASE FLUID | |
|---|---|
| Component | Wt. % |
| Ethylene Glycol | 96.38 |
| Sodium Tetraborate | 1.96 |
| (as $Na_2B_4O_7.5H_2O$) | |
| NaOH, 50% aq. | 0.99 |
| NaTTZ, 50% aq. | 0.17 |
| NaNO$_3$, 40% aq. | 0.50 |
| Total | 100.00 |

The concentrate was diluted to make a working antifreeze solution by mixing 33 vol. percent of concentrate with 67 vol. percent of "corrosive water" (deionized water containing 300 ppm. each of $SO_4^=$, $HCO_3^-$ and $Cl^-$, all added as the Na salts).

C. Laboratory Disc Heat Flux Test: Method, Apparatus and Results

A standard test method used in the antifreeze industry was employed to determine the corrosion inhibitory effect of the formulated composition of the present invention with respect to heat rejecting aluminum surfaces. This test method is described in *Corrosion*, 15,257t at 258t (1959) "Laboratory Methods for Determining Corrosion Rates Under Heat Flux Conditions" and also in an ASTM publication entitled, "Engine Coolant Testing: State of the Art," a symposium sponsored by ASTM Committee D-15, at pages 17-19 (Printed, May 1980), both incorporated herein by reference. A summary of the test equipment and procedure follows:

The apparatus consists of a 1 liter flask, fitted with a condenser, a thermometer, a cold finger, a temperature controller, a $1\frac{1}{2}$ inch diameter $\times \frac{1}{4}$ inch thick No. 319 aluminum casting alloy (herein "the aluminum disc"), and a soldering iron heat source.

The apparatus was charged with 750 ml. of test solution and heated to effect boiling at the aluminum disc surface and to maintain a solution temperature of about 75° C. The test duration was 168 hours. The weight loss of aluminum from the aluminum disc was determined and used as a measure of corrosion inhibitor effectiveness. The results, expressed in terms of milligrams of aluminum weight loss on an aluminum disc for various base polyols and organophosphate derivatives thereof, together with the precent inhibition corresponding to each weight loss, are presented in Table I which follows. Percent inhibition is calculated as follows:

$$\% \text{ inhibition} = (1 - wi/wo) \times 100$$

where wi=aluminum weight loss with polyol or organophosphate present and wo=aluminum weight loss with polyol or organophosphate absent.

TABLE I

ALUMINUM DISC TEST RESULTS FOR COMMERCIAL POLYOLS AND THEIR CORRESPONDING SYNTHETIC ORGANOPHOSPHATE DERIVATIVES

| | Polyol | | Phosphate Ester | |
|---|---|---|---|---|
| Fluid (Molecular Wt.)[1] | Al Wt. Loss (mg) | % Inhibition | Al Wt. Loss (mg) | % Inhibition |
| UCON LB Fluids[2] | | | | |
| LB-65 (MW 360) | 73 | 30 | 104 | 10 |
| LB-135 (MW 650) | 81 | 23 | 32 | 70 |
| LB-165 (MW 750) | 78 | 26 | 14 | 87 |
| LB-285 (MW 1040) | 71 | 32 | 15 | 86 |
| LB-385 (MW 1220) | 89 | 15 | 8 | 92 |
| LB-525 (MW 1400) | 104 | 1 | 43 | 59 |
| LB-625 (MW 1700) | 109 | −4[5] | 95 | 10 |
| LB-1145 (MW 2200) | 85 | 19 | 62 | 41 |
| LB-1715 (MW 2600) | 69 | 34 | 78 | 26 |

TABLE I-continued
ALUMINUM DISC TEST RESULTS FOR COMMERCIAL POLYOLS AND THEIR CORRESPONDING SYNTHETIC ORGANOPHOSPHATE DERIVATIVES

| | | | | |
|---|---|---|---|---|
| LB-3000 (MW 3000) | 102 | | 3 | 84 | 20 |
| BASF PLURONIC Compounds[2] | | | | |
| L-31 (MW 1100) | 76 | | 28 | 33 | 69 |
| L-35 (MW 1900) | 72 | | 31 | 63 | 40 |
| L-42 (MW 1630) | 70 | (3 day) | —[3] | 22 | 79 |
| L-43 (MW 1850) | 86 | | 18 | 57 | 46 |
| L-44 (MW 2200) | 86 | | 18 | 42 | 60 |
| L-61 (MW 2000) | 88 | | 16 | 25 | 76 |
| L-62 (MW 2500) | 96 | | 9 | 15 | 86 |
| L-63 (MW 2650) | 108 | | −3 | 18 | 83 |
| L-64 (MW 2900) | 85 | | 19 | 25 | 76 |
| L-72 (MW 2750) | 99 | | 6 | 24 | 77 |
| L-81 (MW 2750) | 82 | | 22 | 56 | 47 |
| L-92 (MW 3650) | 82 | | 22 | 16 | 85 |
| L-101 (MW 3800) | 117 | | −11 | 67 | 36 |
| L-121 (MW 4400) | 85 | | 19 | 74 | 30 |
| L-122 (MW 5000) | 83 | | 21 | 96 | 9 |
| P-84 (MW 4200) | 86 | | 18 | 67 | 36 |
| P-85 (MW 4600) | 116 | | −10 | 95 | 10 |
| P-103 (MW 4950) | 84 | | 20 | 75 | 29 |
| P-104 (MW 5850) | 81 | | 23 | 70 | 33 |
| P-105 (MW 6500) | 90 | | 14 | 94 | 10 |
| Others[2] | | | | |
| Cyclophos PV-4 (MW 2000)[4] | — | | — | 6 | 94 |
| Carbowax 3350 (MW 3350) | 80 | | 24 | 93 | 11 |
| PPG-725 (MW 725) | 69 | | 34 | 17 | 84 |
| UCON 25-H-2000 (MW 4000) | 73 | | 30 | 86 | 18 |
| UCON 75-H-1400 (MW 2500) | — | | — | 89 | 15 |
| UCON 75-HB-280 (MW 1000) | 79 | | 25 | 89 | 15 |
| TERGITOL NP-4 (MW 396) | — | | — | 64 | 39 |
| TERGITOL 25-L-7 (MW 550) | — | | — | 112 | −7 |
| TRITON-X-100 (MW 630) | — | | — | 33 | 69 |
| TRITON-X-102 (MW 720) | — | | — | 57 | 46 |
| UCON-50-HB-170 (MW 730) | 66 | | 37 | 84 | 20 |
| UCON-50-HB-660 (MW 1700) | 91 | | 13 | 70 | 33 |

Footnotes to Table I.
[1] The molecular weights (MW) are approximate.
[2] Description of the Parent Polyols.
UCON LB fluids - alcohol (butanol) initiated polymers of all oxypropylene groups; n-BuO—(CH$_2$—CHCH$_3$—O)$_x$H, products of Union Carbide

| | |
|---|---|
| BASF PLURONICS - | nonionic surfactant block copolymers of propylene oxide and ethylene oxide. The ethylene oxide content by weight is designated by the second digit multiplied by ten; e.g. L-31 contains 10% by weight ethylene oxide. (L = liquid, P = paste). |
| PPG-725 - | polypropylene glycol |
| UCON 25-H - | diol initiated random copolymer containing 25 weight percent ethylene oxide and 75 weight percent propylene oxide, a product of Union Carbide Corp. |
| UCON 75-H - | diol initiated random copolymer containing 75 weight percent ethylene oxide and 25 weight percent propylene oxide, a product of Union Carbide Corp. |
| UCON 75-HB - | alcohol (butanol) initiated polymers containing 75 weight percent polyoxyethylene groups and 25 weight percent polyoxypropylene groups, a product of Union Carbide Corp. |
| CARBOWAX 3350 - | a polymer of ethylene oxide of formula HOCH$_2$(CH$_2$OCH$_2$)$_{76}$CH$_2$OH, a product of Union Carbide Corp. |
| TERGITOL NP-4 - | nonionic surfactant based upon ethoxylated nonylphenol having the structure C$_9$H$_{19}$C$_6$H$_4$O(CH$_2$CH$_2$O)$_4$H, a product of Union Carbide Corporation |
| TERGITOL 25-L-7 - | nonionic surfactant consisting of a mixture of ethoxylated primary alcohols having the structure RO(CH$_2$CH$_2$O)$_x$H where R = C$_{12-15}$ and x = 7 on average, a product of Union Carbide Corporation. |
| TRITON X-100 - | nonionic surfactant based upon ethoxylated octyl phenol having the structure C$_8$H$_{17}$C$_6$H$_4$O(CH$_2$CH$_2$O)$_{10}$H, product of Rohm & Haas Corporation |
| TRITON X-102 - C$_8$H$_{17}$C$_6$H$_4$O(CH$_2$CH$_2$O)$_{12}$H, a product of | as for TRITON X-100; |
| | Rohm & Haas Corporation |

[3] As used in Table I, "—" denotes "not available".
[4] CYCLOPHOS PV-4 - a propylene oxide/ethylene oxide based phosphate ester product of Cyclo Chemicals, Inc. having greater than 60 wt. % PO based upon total EO + PO.
[5] a negative value for percent inhibition indicates greater corrosion than the base fluid.

The results are presented in Table I show that all-PO containing "LB fluid" (hereinafter referred to by their product numbers) phosphates proved superior to the corresponding unphosphorylated polyol over a molecular weight range of the parent polyol of between 650 and 1400, supporting the range of between about 500 and about 1400. Note that the percent corrosion inhibition for phosphorylated LB-135 (MW=650) is 70%, as compared to a percent inhibition for the corresponding unphosphorylated polyol of 23%. Likewise, the percent inhibition of phosphorylated LB-525 (MW=1400) is 59%, as compared to a percent inhibition for the corresponding unphosphorylated polyol of 1%. Outside the molecular weight range of 650 to 1400, the all-PO containing UCON LB-fluids did not provide significant corrosion inhibition as compared to the unphosphorylated polyols at molecular weights of 360 and 1700.

The PO/EO-containing PLURONIC compounds (hereinafter referred to by their product numbers), when phosphorylated, performed consistently better in terms of percent corrosion inhibition as compared to the respective unphosphorylated polyol up to a molecular weight of about 4400 (see "L-121"). In contrast, at a molecular weight of 5000 (see "L-122"), the percent corrosion inhibition for the unphosphorylated polyol (21%) exceeds that obtained using the phosphorylated polyol (9%). Molecular weights down as low as 1100 for the PLURONIC polyol before phosphorylating were found to provide excellent corrosion inhibition results after phosphorylating.

Another factor influencing the results obtained for the various phosphorylated PLURONICS, in addition to the molecular weight factor, is the ratio of PO to EO in the polyol.

In general, polyols having PO to EO ratios of 50:50 on a weight basis produced the poorest results when phosphorylated (see "L-35", "P-85" and "P-105"). In contrast, polyols having a PO:EO ratio of at least 60:40 produced generally better results (see all other PLURONICS in Table I).

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

We claim:

1. An antifreeze composition concentrate comprising:
   (a) alcohol,
   (b) at least one buffer selected from the group consisting of salts of boric, phosphoric, benzoic, substituted benzoic, dibasic acids having 6 to 20 carbon atoms, and mixtures thereof, and
   (c) at least one alkylene oxide-containing organophosphate, in a corrosion inhibiting-effective amount, said organophosphate being selected from the group consisting of PO- and PO/EO-containing organophosphate mono-, di- and triesters and mixtures thereof, wherein the PO content is at least 60% based on the weight of the total PO+EO in the ester and wherein the PO-containing organophosphate esters have a molecular weight between 650 and 1400 and wherein the PO/EO-containing organo-phosphate esters have a molecular weight between 1100 and 4500, and wherein said organophosphate is selected from the group defined by the following structural formulae I, II and III:

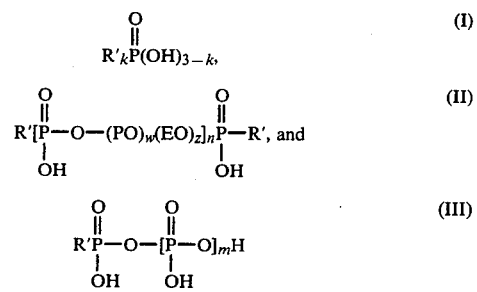

wherein
$R' = [RO(PO)_x(EO)_y]$ wherein R=H or alkyl, aryl, alkylaryl, arylalkyl, alkenyl or alkynyl having up to 24 carbon atoms,
PO=Propylene oxide radical,
EO=Ethylene oxide radical,
$x = 1$ to 100,
$y = 0$ to 100,
$k = 1$ to 3, with the proviso that when $k = 3$, at least one R' group is removed from the phosphate ester by hydrolysis prior to or during use,
$n = 1$ to 100,
$w = 0$ to 100, with the proviso that when $w > 1$, x can be zero,
$z = 0$ to 100,
$m = 1$ to 10.

2. The concentrate of claim 1 wherein the amount of component (c) is present in an amount of between about 0.001 and about 30 weight percent based on the total weight of the concentrate.

3. The concentrate of claim 1 wherein component (c) is present in an amount of between about 0.005 and about 1 weight percent based on the total weight of the concentrate.

4. The concentrate of claim 1 wherein component (b) is present in an amount of between about 0.1 and about 10 weight percent based on the weight of the concentrate.

5. The concentrate of claim 1 wherein component (b) is present in an amount of between about 0.1 and about 5 weight percent based on the weight of the concentrate.

6. The concentrate of claim 1 having a pH of between about 5.5 and about 11.

7. A method of using the concentrate of claim 1 which comprises, without regard to sequence, the steps of:
   (a) diluting the concentrate with water or a mixture water and alcohol to produce a working antifreeze, and
   (b) adding the working antifreeze to an automobile engine coolant system.

8. The concentrate of claim 1 wherein said alcohol is selected from the group consisting of ethylene glycol, diethylene glycol, propylene glycol, dipropylene glycol, and mixtures thereof.

9. An antifreeze composition comprising the concentrate of claim 1 and additionally containing water or aqueous alcohol in an amount sufficient to form a diluted antifreeze.

10. An antifreeze composition concentrate comprising:
    (a) ethylene glycol
    (b) salts of boric acid in an amount of between 0.1 and about 5 wt. percent based on the weight of the concentrate, and
    (c) at least one organophosphate, in an amount of between about 0.005 and about 0.1 weight percent, based on the weight of the concentrate.

* * * * *